United States Patent [19]

D'Agostino

[11] 3,980,880

[45] Sept. 14, 1976

[54] AUTOMATIC EXPOSURE CONTROL CIRCUIT FOR AN IMAGE INTENSIFIER CAMERA

[75] Inventor: John A. D'Agostino, Neptune, N.J.

[73] Assignee: The United States of America as represented by the Secretary of the Army, Washington, D.C.

[22] Filed: Apr. 4, 1974

[21] Appl. No.: 457,867

[52] U.S. Cl. ........................ 250/213 VT; 250/206
[51] Int. Cl.² ........................................ H01J 31/50
[58] Field of Search ......... 250/213 R, 213 VT, 206, 250/207, 214; 315/10, 11, 12; 354/48, 50, 51

[56] References Cited
UNITED STATES PATENTS

| | | | |
|---|---|---|---|
| 2,927,215 | 3/1960 | Allen et al. | 250/213 VT |
| 3,436,550 | 4/1969 | Finkle | 250/213 R |
| 3,689,770 | 9/1972 | Dion | 250/213 VT |

*Primary Examiner*—David C. Nelms
*Attorney, Agent, or Firm*—Nathan Edelberg; Michael Zelenka; Sheldon Kanars

[57] ABSTRACT

This invention relates to automatic exposure control for an image-intensification photographic camera through the employment of a capacitor discharge circuit. The electrical energy stored in a capacitor is discharged to activate an image intensifier tube which forms part of the photographic camera system. The characteristics of the capacitor discharge circuit are chosen to correspond to the energy required for proper exposure time through the image intensifier tube and onto a photographic emulsion.

1 Claim, 2 Drawing Figures

AUTOMATIC EXPOSURE CONTROL CIRCUIT FOR AN IMAGE INTENSIFIER CAMERA

BACKGROUND OF THE INVENTION

This invention relates to an image intensifier camera which has automatic exposure control and which has application in aerial and ground surveillance photography.

The typical image intensifier camera consists, basically, of an image intensifier tube having a photocathode, an anode, and an intensifier phosphor screen, an objective lens to focus light from a given scene onto the photocathode, an aperture and a shutter to control the amount and the duration of the focused light striking the photocathode, and a light sensitive film on which an image is recorded when the film is struck by intensified light from the intensifier phosphor screen.

Currently, three types of image intensifier tubes are used in such cameras. The first type is an electrostatically focused image intensifier tube. This tube consists of an electrode located between the photocathode and anode. The electrode is used as a gating and focusing device. The second type is an electromagnetically focused image intensifier tube. External to the tube is a focusing solenoid or focusing magnet which is located parallel to and midway between the photocathode and the anode, and which produces a magnetic field to accomplish focusing. The third type is a micro-channel image intensifier tube. This tube consists of discrete channels located perpendicular to and between the photocathode and the anode. Focusing is accomplished by passage of electrons through the discrete channels.

In using image intensifier cameras for aerial and ground surveillance applications, there exists a need for rapid access to the recorded information because the photographic transparencies developed on the scene are interpreted prior to printing. This requires that there be constant tonal fidelity in the developed transparencies. There, therefore, exists a need for highly accurate automatic exposure control devices for rapid access photographic interpretation. With such accurate control, a roll of film can be exposed uniformly throughout a wide range of scene luminance and the uniform exposure coupled with uniform processing, can yield the tonal fidelity required in the resultant transparencies for rapid access photographic interpretation.

The known conventional techniques for automatic exposure control in image intensifier cameras employ a light sensor located external or internal to the camera body. The information from the light sensor is integrated through circuitry and is used to control exposure by regulating tube voltage, by regulating electronic gain width, by mechanically regulating an aperture, or by mechanically regulating a shutter. These conventional systems normally sense the light from a scene and electronically or mechanically preset the adjustable variables before exposing the film. Because of the response time involved in the electrical or mechanical adjustment and re-adjustment of the variables, a drastic change in scene illumination during exposure will cause either overexposure or underexposure of a given scene as recorded on the film.

SUMMARY OF THE INVENTION

In accordance with the present invention there is provided an automatic exposure control system for use in a camera having an image intensifier tube with a photocathode. Included is a direct current power source and a variable capacitor. Also included are switching means for connecting the variable capacitor to the power source to charge the variable capacitor through the image intensifier tube during a time duration. In addition, there may also be included shutter means for allowing the photocathode to receive light from a given scene for the aforementioned time duration.

The present invention differs from the prior art in that it accomplishes automatic exposure control without the necessity of employing any of the conventional techniques. By use of a capacitor discharge circuit, the present invention is able to respond instantaneously during exposure to sudden changes in scene illumination thereby avoiding any overexposure or underexposure of the film. In addition, because the image intensifier tube of the present invention is active only during actual exposure time, the problems of tube life, light leakage during periods of non-exposure, and required tube power are minimized.

DESCRIPTION OF THE PREFERRED EMBODIMENT

Figure 1:
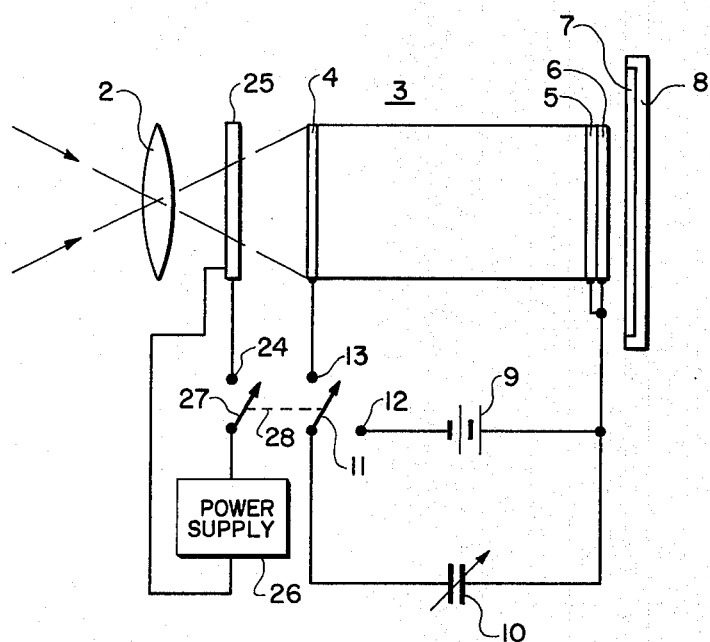
FIG. 1 is a schematic diagram illustrating the preferred embodiment of the automatic exposure control system.
Figure 2:
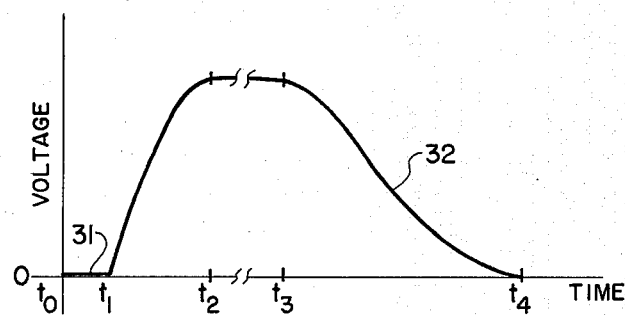
FIG. 2 are waveforms illustrating the operation of the system of FIG. 1.

Referring now to FIG. 1, a direct current power source 9 is shown connected in circuit with a variable capacitor 10 when switch 11 is in position 12. The switch 11 has two distinct operating conditions and an inoperative or open condition, as will be explained later. Initially at time $t_0$, switch 11 is in an inoperative position and, as indicated by the waveform 31 of FIG. 2, the voltage across the capacitor 10 is zero volts. When, at time $t_1$ the switch 11 is moved to position 12, the capacitor 10 commences to charge exponentially to the potential of the direct current power source 9. At some time $t_2$, the switch 11 is moved to the inoperative position. The voltage on the capacitor 10 remains substantially constant, except for a negligible decrease caused by leakage of charge during the quiescent interval that is, during the time $t_2$ to $t_3$ that the switch of FIG. 1 is in the inoperative position. When at time $t_3$, the switch 11 is moved to position 13, the capacitor 10 is connected in circuit with the image intensifier tube 3. This circuit is created by connecting the position 13 of switch 11 to the photocathode 4 of the image intensifier tube 3 and by connecting the other end of the direct current power source 9 to the anode 5 and the phosphor screen 6 of the image intensifier tube 3, such that the anode 5 and the phosphor screen 6 are at the same potential.

When an image is to be recorded on a photographic emulsion 7, which is held in place by film holder 8, light from a given scene is permitted to be received on the photocathode 4 at the time $t_3$ through the optical system 2 of the camera. A power supply 26 is shown which can be connected in circuit with an electronic shutter 25, when switch 27 is in position 24, at time $t_3$ to allow the photocathode 4 to receive the light from the given scene. In the preferred embodiment of the invention a conventional double-pole double-throw switch 28 is used as switch 27 and switch 11. This is to insure that the shutter 25 is opened at time $t_3$ which is the time when the discharging circuit containing the capacitor 10 and the image intensifier tube 3 is formed. It is obvious that other conventional mechanical, electro-mechanical, and electronic switches may be used to accomplish the same function. It is also obvious that an entirely mechanical shutter system could be used in place of the electronic shutter system of the preferred embodiment.

The capacitor 10 now discharges through the image intensifier tube 3 with the tube 3 acting as a variable resistance in the discharge circuit. The variable resistance is a function of the light intensity received by the photocathode 4. The current through the image intensifier tube 3 will exponentially decay, as shown in the waveform 32 of FIG. 2, with the rate of decay dependent on the light intensity incident to the photocathode.

The capacitance and operating voltage of the variable capacitor are chosen such that they correspond to the energy required to provide proper exposure through the image intensifier tube 3 and onto the photographic emulsion 7. The photographic emulsion requires S ergs/cm$^2$ of exposure to an activated image intensifier phosphor screen 6 to record an image. The total exposure received over the exposed emulsion will then be $\pi d^2 S/4$ ergs where $d$ is the diameter of the phoshor screen in cm. If the radiant efficiency of the phosphor screen is E ergs out/ergs in then $\pi d^2 S/4E$ ergs of energy must be supplied to the device for proper exposure. The amount of energy can be supplied by the variable capacitor when $\frac{1}{2}CV^2 = \pi d^2 S/4E$ where C is the capacitance and V is the voltage. Further, it is obvious to one skilled in the art that in applying the formulas to determine the capacitance allowance must be made for reactance losses, phosophor screen dead voltage losses, and the like. From this it can be seen that in practical application the voltage from the power source 9 must be on the order of kilovolts and the capacitance 10 must be very small.

When the capacitor 10 is completely discharged at time $t_4$, the flow of electrons resulting from the capacitor being discharged through the image intensifier tube 3 ceases with the result that no more intensified light from the intensifier phosphor screen 6 is emitted onto the photographic emulsion 7. The recording of an image onto the photographic emulsion 7 is now complete.

This invention is not limited to the particular details of construction, materials and processes described, as many equivalents will suggest themselves to those skilled in the art. It is desired, accordingly that the appended claims be given a broad interpretation commensurate with the scope of the invention within the art.

What is claimed is:

1. In combination with a camera having an image intensifier tube including a photocathode, an anode and phosphor screen, and characterized by variable resistance that is a function of light intensity incident on the photocathode when the photocathode is exposed to light, an automatic exposure control system comprising:
    a direct current power source;
    a variable capacitor; and
    switching means operable for connecting said variable capacitor across said power source to charge said variable capacitor from said power source, and operable for disconnecting the charged variable capacitor from the power source and for connecting the charged variable capacitor in series with the photocathode and anode and phosphor screen for discharging said variable capacitor through said image intensifier tube and wherein the rate of discharge is dependent continuously on the light intensity incident to the photocathode during the discharge.

* * * * *